(12) United States Patent
Kim

(10) Patent No.: US 6,307,907 B1
(45) Date of Patent: Oct. 23, 2001

(54) COMPLEX MULTIPLIER

(75) Inventor: Dae-Hyun Kim, Seoul (KR)

(73) Assignee: Hyundai Electronics, Ind., Co., Ltd., Kyoungki-Do (CN)

( * ) Notice: Subject to any disclaimer, the term of this patent is extended or adjusted under 35 U.S.C. 154(b) by 0 days.

(21) Appl. No.: 09/046,823

(22) Filed: Mar. 24, 1998

(30) Foreign Application Priority Data

Jun. 28, 1997 (KR) .................................................. 97-28627

(51) Int. Cl.$^7$ .................................................. H04L 23/00
(52) U.S. Cl. .......................... 375/377; 708/622; 713/501
(58) Field of Search .................................. 708/620–632; 713/401, 500, 501; 375/329, 354, 355, 377

(56) References Cited

U.S. PATENT DOCUMENTS

| | | |
|---|---|---|
| 3,849,730 | 11/1974 | Ho . |
| 5,440,587 | 8/1995 | Ishikawa et al. . |
| 5,533,070 | 7/1996 | Krishnamurthy et al. . |
| 5,621,730 | 4/1997 | Kelley . |

*Primary Examiner*—Chi Pham
*Assistant Examiner*—Jean B Corrielus
(74) *Attorney, Agent, or Firm*—Bryan Cave LLP

(57) ABSTRACT

Complex multiplication is performed using a multiplier by generating time division signals with a first clock and a second clock having a speed twice as fast as the first clock and operating the multiplier in a time division mode by the time division signals. Using a first clock and a second clock, the time division signals delayed by one-forth cycle are generated during one cycle of the first clock. Real element and imaginary element of two complex numbers are stored in D flip flops. A multiplexer driven by the time division signals selects each element of the complex numbers. A multiplier multiplies the selected elements in the selected time order. The multiplication results are latched in a plurality of D flip flops according to the time division signals. The latched multiplication results are added or subtracted with adder and subtracter. The outputs of the adder and subtracter are stored in D flip flops and output from the D flip flops, thereby obtaining the multiplication of two complex numbers. Also, the absolute values of sin θ and cos θ are stored in memory and subtraction using complements of the number 2 of the absolute values of sin θ and cos θ reduce the size of the memory by half.

10 Claims, 8 Drawing Sheets

COMPLEX MULTIPLIER

BACKGROUND OF THE INVENTION

Field of the Invention

The present invention relates to a complex multiplier, and more particularly relates to the complex multiplier operating complex multiplication using a multiplier by generating time division signals with a data clock and a clock having a speed twice as fast as the data clock and operating the multiplier in a time division mode by the time division signals.

BACKGROUND OF THE INVENTION

In HDTV (High Definition Television) system, the phase tracking loop is followed by a channel equalizer step. Phase noise is removed, and data correcting the phase noise is outputted to the decoder thereafter.

The phase tracking loop receives I signal (In-phase) from the equalizer, adjusts the gain of the I signal and corrects the phase according to information based on the phase distortion obtained from phase adjustment loop. In the phase adjustment loop, because obtaining the phase distortion from only I signal is impossible, Q(Quadrature) signal is calculated from the I signal. Then, phase distortion occurs due to the two signals. Q signal is obtained by Hilbert-Transforming the I signal. The phase of the complex signal is complemented with complex multiplier. The invention disclosed in U.S. Pat. No. 5,533,070 proposes a simple structure of complex multiplier which is used to find the phase error of I signal. A complex multiplier can operate the complex multiplication. FIG. 1 shows a prior complex multiplier, which comprises a first register 1 for receiving I value of two complex numbers; a second register 2 for receiving Q value; a third register 3 for receiving cos θ; a fourth register 4 for receiving sin θ; four multipliers 5,6,7,8 for producing four items resulting from the multiplication of two complex numbers applied through the first register 1 to the fourth register 4; four registers 9,10,11,12 for storing outputs from the four registers 5,6,7,8; a first subtracter/adder for subtracting or adding the values stored in the two registers 9,10; a second subtracter/adder for subtracting or adding the values stored in the two registers 11,12; first and second shift register 15,16 for shifting the values from the first and the second subtracter/adder 13,14; and ninth and tenth registers 17,18 for buffering output.

The above mentioned complex multiplier multiplies each item of two complex numbers and adds/subtracts the multiplying results. The detailed description of the complex multiplication is as follows:

If the outputs of complex multiplier are I', Q', $$I'=I \cos \theta - Q \sin \theta \quad (1)$$

$$Q'=I \sin \theta + Q \cos \theta \quad (2)$$

Here, I is I input value of N(integer) bits, Q is Q input value of N(integer) bits, cos θ and sin θ are N bits cosine input and N bits sine input. Also, in the equations (1),(2), even number items on the right side represent complex numbers, and symbol j representing complex number is attached but abbreviated.

If I, Q, cos θ, sin θ are correspondingly input to the first though the fourth registers 1–4 in sequence as shown in FIG. 1, the first multiplier 5 produces I cos θ, the second register 6 Q sin θ, the third register 7 Q cos θ, and the fourth register 8 I sin θ. The multiplication results are each stored in the fifth register 9 though the eighth register 12 in order.

The first subtracter/adder 13 operates "I cos θ+Q sin θ" in equation (1), and the second subtracter/adder 14 operates "I sin θ+Q cos θ" in equation (2). Accordingly, the result of equation (1) is stored in the ninth register 17, the result of equation (2) is stored in the tenth register 18, and each result is output respectively.

The prior complex multiplier operating as mentioned in the above description operates each of the multiplications (I cos θ, Q sin θ, I sin θ, Q cos θ) with four multipliers. Therefore, it has problems. Firstly, a number of circuit elements are used in order to comprise four multipliers; secondly, the manufacturing process is complicated much more; and thirdly, due to a number of circuits, the volume is large and the production cost is high.

SUMMARY OF THE INVENTION

Therefore, it is an object of the present invention to provide a complex multiplier for solving the problems.

It is another object of the present invention to provide a the complex multiplier operating complex multiplication using a multiplier by generating time division signals with a data clock and a clock having a speed twice as fast as the data clock and operating the multiplier in a time division mode by the time division signals.

It is another object of the present invention to provide a complex multiplier in which the absolute values of sin θ and cos θ are stored in the memory using complement of the number 2 of sin θ and cos θ, thereby reducing the size of the memory by half.

In order to achieve the above objects of the present invention, complex multiplication is performed using a multiplier by generating time division signals with a first clock and a second clock having a speed twice as fast as the first clock and operating the multiplier in a time division mode by the time division signals. Using a first clock and a second clock, the time division signals delayed by one-forth cycle are generated during one cycle of the first clock. Real element and imaginary element of two complex numbers are stored in D flip flops. A multiplexer driven by the time division signals selects each element of the complex numbers. A multiplier multiplies the selected elements in the selected time order. The multiplication results are latched in a plurality of D flip flops according to the time division signals. The latched multiplication results are added or subtracted with adder and subtracter. The outputs of the adder and subtracter are stored in D flip flops and output from the D flip flops, thereby obtaining the multiplication of two complex numbers.

Furthermore, the absolute values of sin θ and cos θ are stored in memory and subtraction using complements of the number 2 of the absolute values of sin θ and cos θ reduce the size of the memory by half.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DESCRIPTION OF THE PREFERRED EMBODIMENT

The present invention will be better clarified by describing a preferred embodiment thereof with reference to the above accompanying drawings.

First Embodiment

Figure 1:
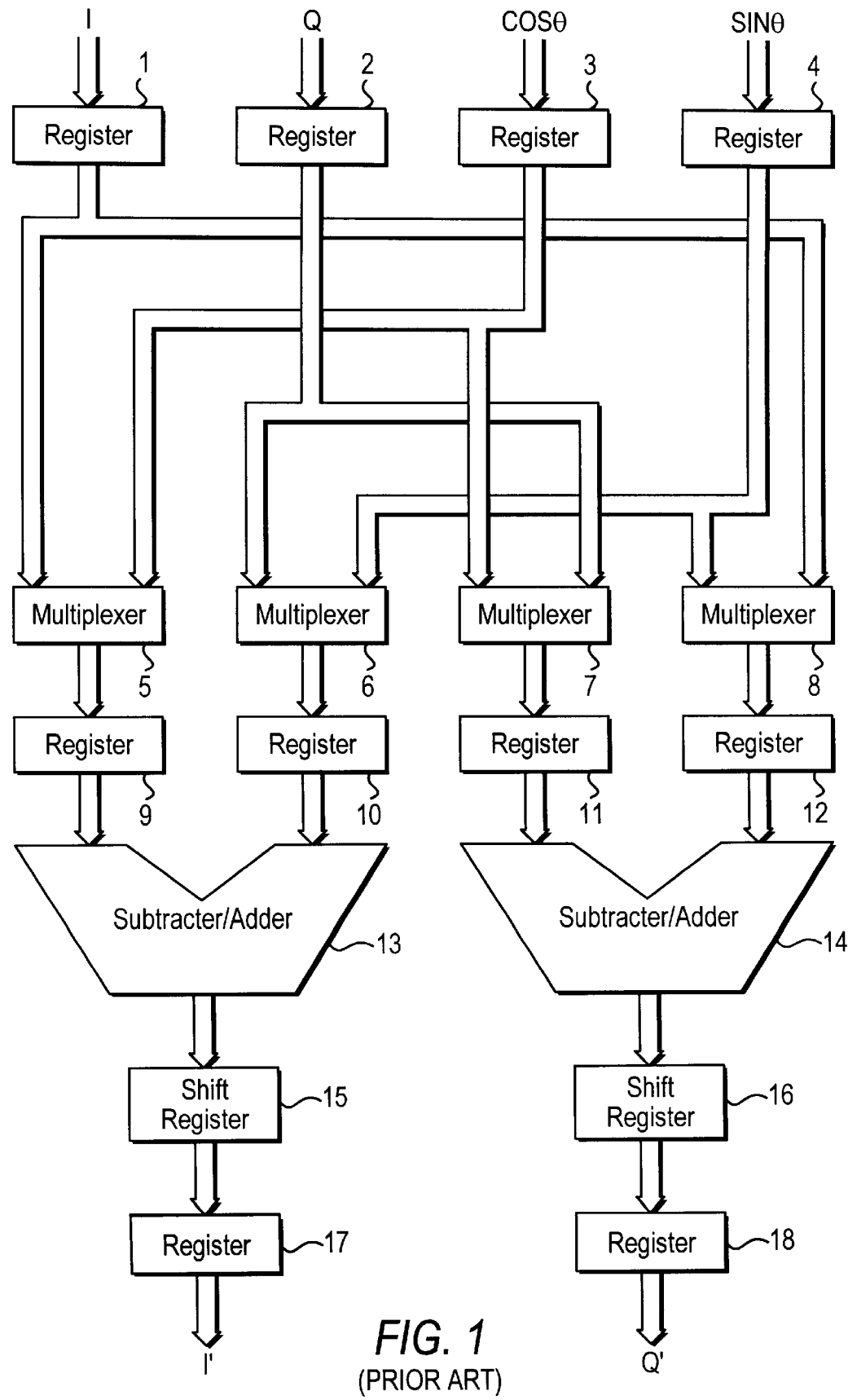
FIG. 1 is a block diagram of the complex multiplier according to the prior art.
Figure 2:
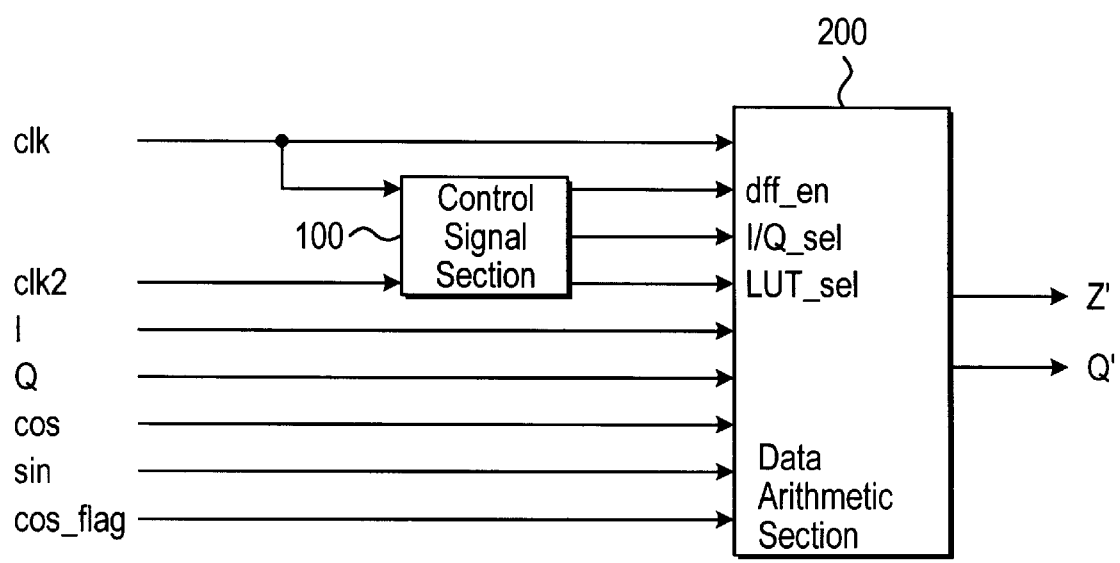
FIG. 2 is a block diagram showing the first embodiment of the complex multiplier according to the present invention.

FIG. 2 illustrates a simplified block diagram of components of a complex multiplier according to the present invention. A control signal section 100 generates a control signal, and a data arithmetic section 200 runs complex multiplying operation utilizing a multiplier during one data clock period with respect to the control signal of the control signal section 100.

Figure 3:
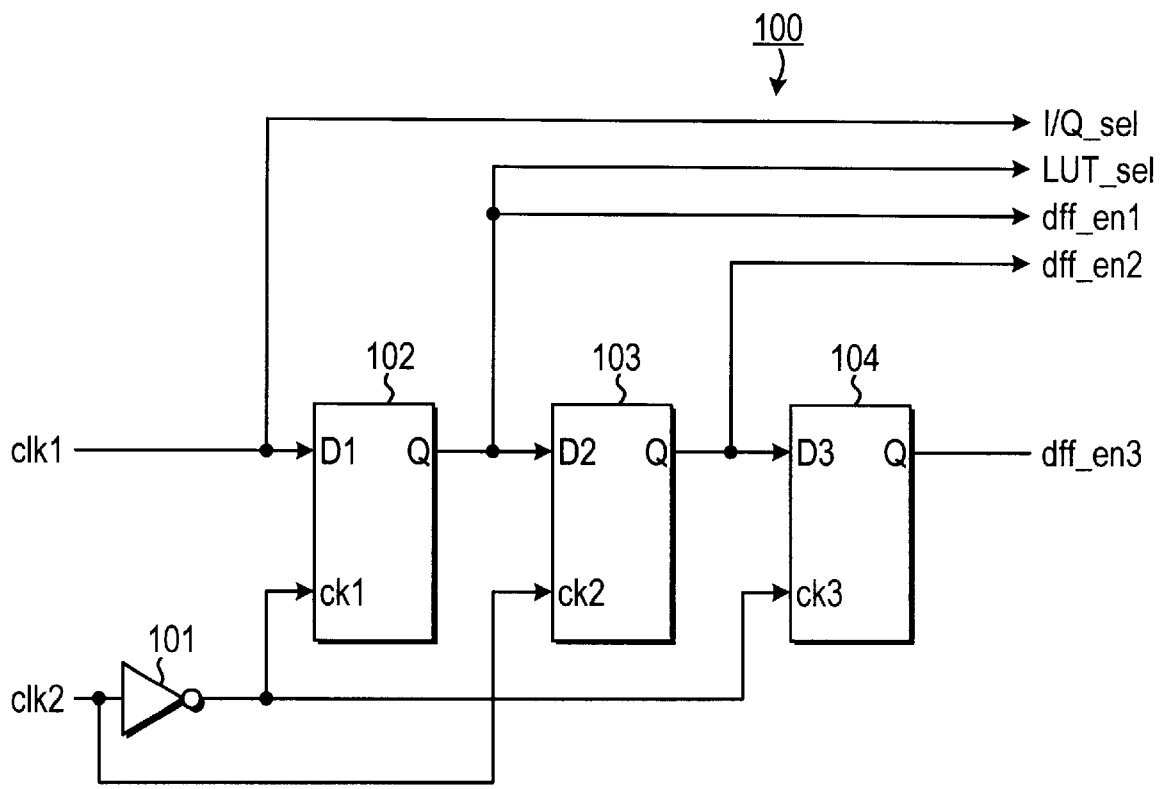
FIG. 3 is a block diagram showing control section of the complex multiplier according to the first embodiment of the present invention.

FIG. 3 illustrates a detailed block diagram of the control signal section 100. Three D flip flops 102–104 are connected in series. To respective clock terminals ck1, ck3 of the first D flip flop 102 and the third D flip flop 104 a second data clock clk2 is input, which is inverted 180° by an inverter 101 and has twice the speed with respect to the first data clock clk1. A second data clock clk2 is input to a clock terminal ck2 of the second D flip flop 103.

The first data clock clk1 is input to an input terminal D1 of the first D flip flop 102, while the second data clock clk2 having the above magnitude is input to the clock terminal ck1 of the first D flip flop 102. The delayed signal dff_en1 is output from an output terminal Q of the first D flip flop 102, with the signal dff_en1 being delayed by one-fourth period at a negative edge of the second data clock clk2. In a similar fashion, the signals dff_en2, dff_en3 delayed by one-fourth period are output from corresponding output terminals Q of respective second D flip flop 103 and third D flip flop 104. A first select signal I/Q_sel utilizes the first data clock clk1, while a second select signal LUT_sel utilizes the signal output from the output terminal Q of the first D flip flop 102.

Figure 4:
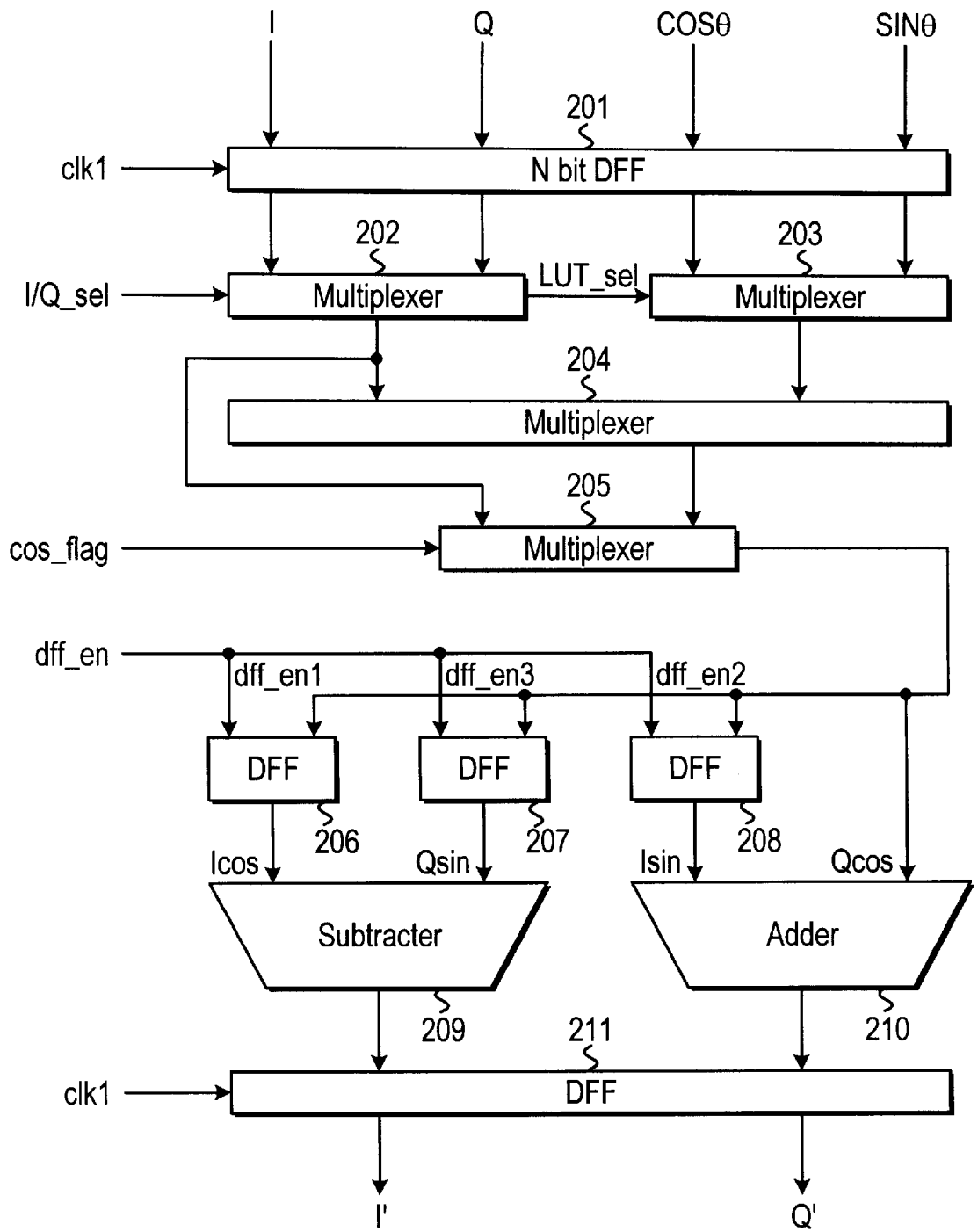
FIG. 4 is a block diagram showing data arithmetic section of the complex multiplier according to the first embodiment of the present invention.

FIG. 4 represents a block diagram of the arithmetic section according to the present invention. A fourth D flip flop 201 comprises four N bit D flip flops and receives from respective flip flops 102,103 and 104 absolute data I,Q of two complexes, cos θ and sin θ which correspond to a real number and an imaginary number. The input data are derived from the fourth D flip flop 201 according to the application of the first clock clk1. A first multiplexer 202 and a second multiplexer 203 output the data selected by the fourth D flip flop 201. The first multiplexer 202 performs the output of one selected signal among the signals I,Q by the first select signal I/Q—sel generated from the control section 100. In a similar fashion, the second multiplexer 203 outputs one selected signal among the signals cos θ and sin θ by the second select signal LUT—sel generated from the control section 100. Therefore, I cos θ, I sin θ, Q cos θ and Q sin θ are output from a multiplier 204 as multiplication result.

The first clock clk1 is applied to the fourth D flip flop 201 for its operation, the first select signal I/Q_sel is applied to the first multiplexer 202 for the operation of the first multiplexer, and the second select signal LUT_sel is applied to the second multiplexer 203 for the operation of the second multiplexer.

A bypass path is provided between the output signal terminal of the first multiplexer 202 and the input signal terminal of a third multiplexer 205. The output value of the first multiplexer 202 is directly input to the multiplexer 205 without passing through the multiplexer 204 in cooperation with the bypass signal cos_flag representing (the value of) cos θ indicating "1".

The output of the third multiplexer 205 is commonly input to a fifth D flip flop 206, a sixth D flip flop 207 and a seventh d flip flop 208. A first time sharing control signal dff_en1 is applied to the fifth D flip flop 206 as the clock signal and the input signal are output. In a similar fashion, a second time sharing control signal dff_en2 is applied to the seventh D flip flop 208 as the clock signal and the input signal are output. Further, a third time sharing control signal dff_en3 is applied to the sixth D flip flop 207 as the clock signal and the input signal are output.

Each output value of the fifth D flip flop 206 and the sixth D flip flop 207 is input to a subtracter 209, while each output value of the seventh D flip flop 208 and the third multiplexer 205 is input to an adder 210.

Figure 5:
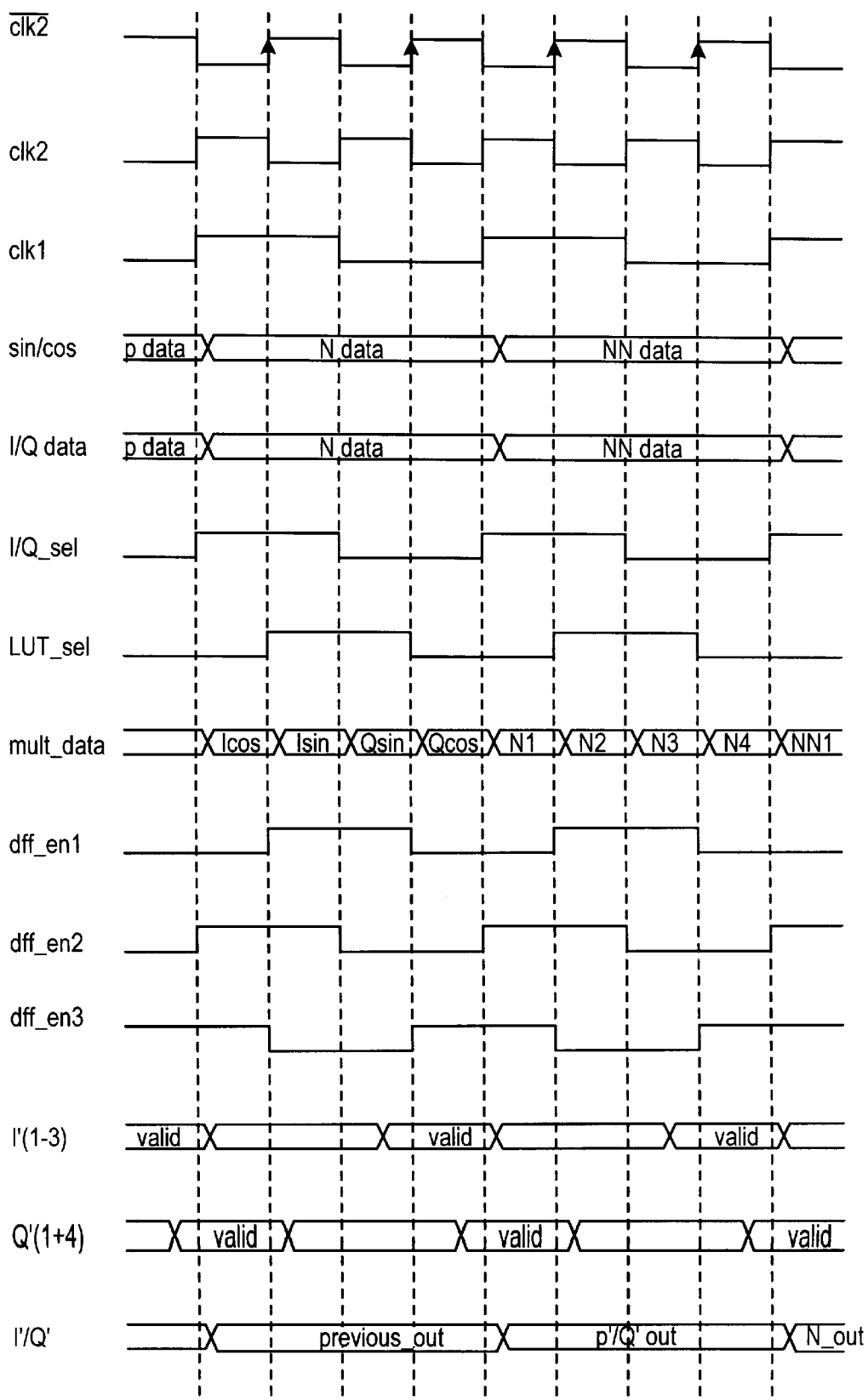
FIG. 5 is a timing diagram of the complex multiplier according to the present invention.

FIG. 5 shows a timing chart for presenting the operation of complex multiplier for complements of the number 2.

The first clock clk1 is applied to the first D flip flop 102, and the second clock clk2 having twice the speed of the first clock is inverted by the inverter 101 and is applied to the clock terminal of the first D flip flop 102. When the second clock clk2 is low, the first time division control signal dff_en1 which is delayed by one-fourth period with respect to the first clock clk1 is derived from the first D flip flop 102. In a similar manner, the second time division control signal dff_en 2 and the third time division control signal dff_en3 which are delayed by one-fourth period are sequentially generated by the second D flip flop 103 and the third D flip flop 104, respectively. The first clock clk1 is utilized as the first select signal I/Q_sel, while the first time division control signal dff_en1 is utilized as the second select signal LUT_sel.

The value of two complexes selected by the first select signal I/Q_sel and the second select signal LUT_sel is represented as Table 1.

TABLE 1

| first select signal (I/Q_sel) | second select signal (LUT_sel) | selected variable |
| --- | --- | --- |
| 0 (low) | 0 | Q cosθ |
| 0 | 1 | Q sinθ |
| 1 (high) | 0 | I cosθ |
| 1 | 1 | I sinθ |

When the first clock clk1 is high, values I,Q, sin θ and cos θ of two complexes applied to the input terminal of the fourth flip flop 201 are derived from the fourth D flip flop 201.

The value I,Q output from the fourth D flip flop 201 is selected by the first multiplexer 202 according to the first select signal I/Q_sel, and the selected value is output. The value sin θ, cos θ output from the fourth D flip flop 201 is selected by the second multiplexer 203 according to the second select signal LUT_sel and the selected value is output. As shown in Table 1, two combinations (I and cos θ, Q and sin θ), I and sin θ, Q and sin θ)of four variables are selected and input in the adder 204.

When the first select signal I/Q_sel is 1, the second select signal LUT_sel is 0 at t1 period. The first multiplexer 202 selects I, the second multiplexer 203 selects cos θ, and the values are applied to the adder 204. The adder 204 multiplies two variables (I and cos θ). The add result is applied by the fifth D flip flop 206 to the seventh D flip flop 208 and the adder 210 through the third multiplexer 205, and is output through the fifth D flip flop 206 when the first time division control signal dff_en1 is high.

When the first select signal I/Q_sel is 1, the second select signal LUT_sel is 1 at t2 period. The first multiplexer 202 selects I, and the second multiplexer 203 selects sin θ, and the values are applied to the adder 204. The adder 204 multiplies two variables (I and sin θ). The add result is applied by the fifth D flip flop 206 to the seventh D flip flop 208 and the adder 210 through the third multiplexer 205, and is output through the seventh D flip flop 208 when the second time division control signal dff_en2 is high.

When the first select signal I/Q_sel is 0, the second select signal LUT_sel is 1 at t3 period. The first multiplexer 202 selects Q, and the second multiplexer 203 selects sin θ, and the values are applied to the adder 204. The adder 204 multiplies two variables (Q and sin θ). The add result is applied by the fifth D flip flop 206 to the seventh D flip flop 208 and the adder 210 through the third multiplexer 205, and is output through the sixth D flip flop 207 when the third time division control signal dff_en3 is high.

The data of two complexes are input according to the signal delayed by one-fourth period with respect to the first clock clk1. The multiplications occurring four times are performed during the one clock period of the first clock. Each is latched respectively to D flip flops 206, 207, and 208. At this time, the last operation result Q cos θ is already output from the multiplexer 204.

The values stored in the fifth D flip flop 206 and the sixth D flip flop 207 are input to the subtractor 209, and the operation "I cos θ−Q sin θ" is performed. The adder 210 receives the signal stored in the seventh D flip flop 208 and the signal output from the output terminal of the multiplexer 204, and the operation "I sin θ+Q cos θ" is performed. The eighth D flip flop 211 receives the operation result of the subtractor 209 and the adder 210. After passing t4 period, I'=I cos θ−Q sin θ, Q'=I sin θ+Q cos θ are output from the eighth D flip flop 211 when the first clock clk1 is high.

The bypass path provided between the signal output terminal of the multiplexer 202 and the signal input terminal of the third multiplexer 205 inputs the output value of the multiplexer 202 into the third multiplexer 205, the output value detouring the multiplexer 204 by the bypass signal cos_flag when the value of cos θ is 1.

Since the values I,Q are not changed when the value of cos θ is 1, unnecessary operation is restrained. Loss of memory for storing the value of cos θ can be reduced. Complex multiplication operation can be performed by only single multiplexer during the same time period, and the bypass path can reduce loss of memory.

Second Embodiment

The second embodiment utilizes the situation that each value of sin θ and cos θ is the same at '+' period and '−' period except for sign. When each value of sin θ and cos θ is stored at the memory, only '+' value is stored, and the value is used as '−' value during operation if necessary. Therefore, the size of the memory for storing each value of sin θ and cos θ is reduced by half. The construction of the second embodiment is the same as that of the first embodiment, thus the same components are designated by the same numerals and the same terms.

Figure 6:
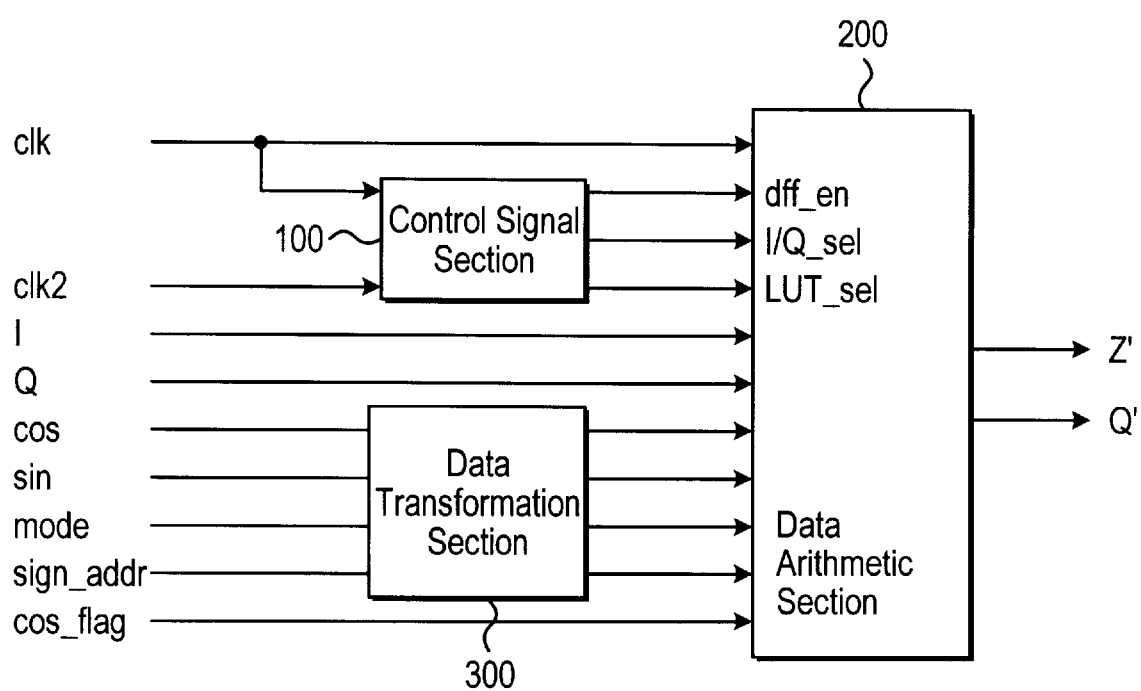
FIG. 6 is a block diagram showing the second embodiment of the complex multiplier according to the present invention.
Figure 7:
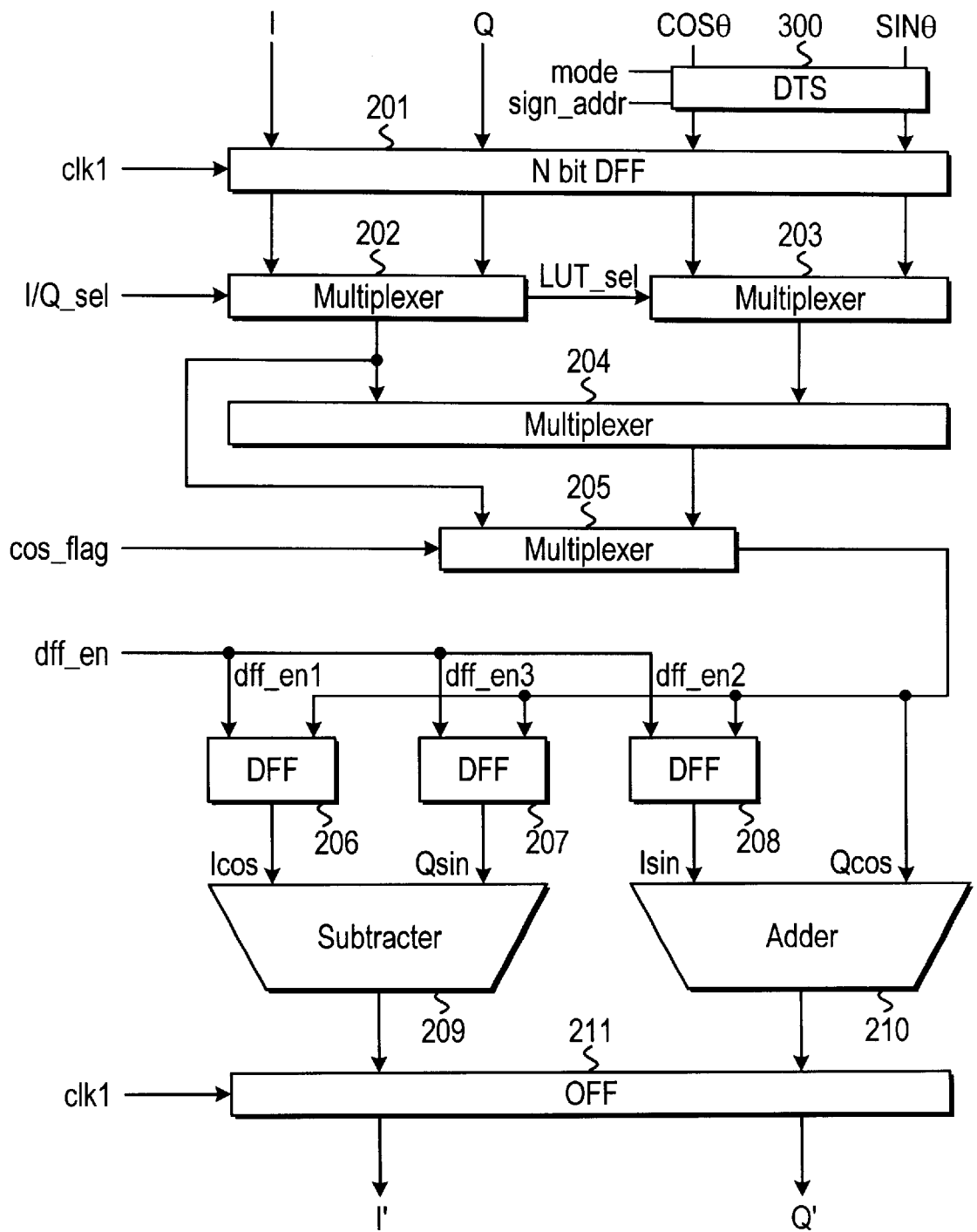
FIG. 7 is a block diagram showing data arithmetic section of the complex multiplier according to the second embodiment of the present invention.

FIG. 6 illustrates the second embodiment of complex multiplier according to the present invention. The mode signal determines whether each value of sin θ and cos θ of complexes is input with the sign or without the sign. The data transformation signal sign_addr indicates whether the mode signal is transformed into value of proper symbol when each value of sin θ and cos θ without symbol is input. Both a mode signal and a data transformation signal are applied to the data transformation section 300. The data transformation section 300 outputs to the data arithmetic section 200 the complement data according to the mode signal and the data transformation signal.

Components of the second embodiment are identical to the first embodiment except for adding the data transformation section 300, so only the data transformation section 300 will be explained below.

Figure 8:
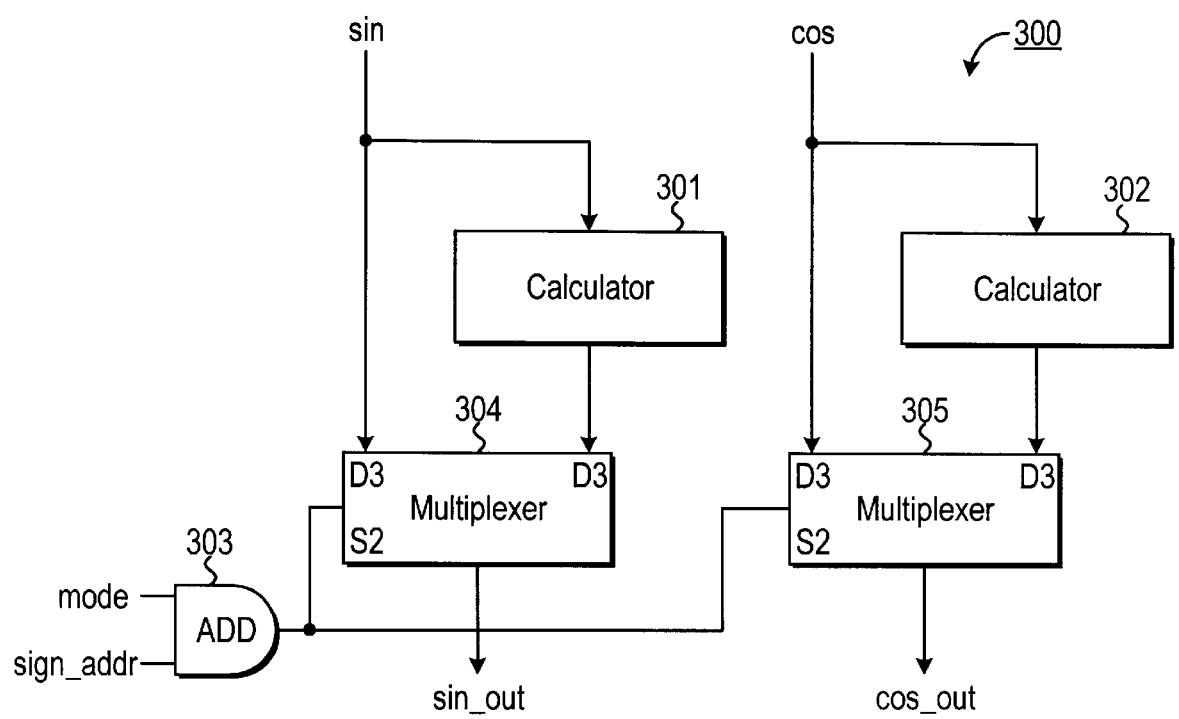
FIG. 8 is the block diagram showing data converting section of the complex multiplier according to the first embodiment of the present invention.

FIG. 8 illustrates a block diagram of the data transformation section according to the present invention. A first complement calculator 301 outputs the calculated complement value of the number 2 of sin θ. The fourth multiplexer 304 selects and outputs the one value between the value of sin θ and the complement value of the number 2 output from the first complement calculator 301. A second complement calculator 302 outputs the calculated complement value of the number 2 of cos θ. The fifth multiplexer 305 selects and outputs the one value between the value of cos θ and the complement value of the number 2 output from the second complement calculator 302. An ADD gate performs an add operation for the mode signal and the data transformation signal, thereby outputting the value.

By an exterior DIP switch for user's convenient manipulation, the mode signal determines whether each value of sin θ and cos θ of complex is input with the sign or without the sign. The data transformation signal sign_addr indicates whether the mode signal is transformed into value of proper symbol when each value of sin θ and cos θ without symbol is input. Both the mode signal and the data transformation signal sign_addr are applied to the input terminal of the ADD gate 303.

When each value of sin θ and cos θ is stored in the memory in accordance with symbol, each value of sin θ and cos θ can be used as is. Operation of the fourth multiplexer 304 and the fifth multiplexer 305 is controlled. The fourth multiplexer 304 and the fifth multiplexer 305 select a value applied to the data input terminal D1, D3 and the value outlet. When the mode signal is "0", the ADD gate outputs the "0" signal. Therefore, the fourth multiplexer 304 and the fifth multiplexer 305 output value applied to the data input terminals D1,D3.

When each value of sin θ and cos θ is stored in the memory without symbol, distinguishment of the sin θ and cos θ symbols is not necessary. The size of the memory for storing value of sin θ and cos θ can reduce by half more than that of the situation of symbol distinguishment, thereby saving the size of the memory. However, when the symbol is "−", the "−" symbol is attached to the read value of sine and cos θ.

When the change of the symbol is not necessary due to the "−" symbol, the mode signal is set as 1 and the data transformation signal sign_addr is set as 0 so that value applied to the first data input terminal D1 of the fourth multiplexer 304 and the first data input terminal D3 of the fifth multiplexer 305 are selected to output.

When the change of the symbol to "−" is necessary, the mode signal is set as 1 and the data transformation signal sign_addr is set as 1 and the signals are input to the ADD gate 303 so that the complement of the number 2 is output from the first complement calculator 301 and the second complement calculator 302. The control of the fourth multiplexer 304 and the fifth multiplexer 305 is performed to output the signal from the first complement calculator 301 and the second complement calculator 302.

The operation in accordance with the mode signal and the data transformation signal sign_addr is represented as Table 2.

TABLE 2

| mode signal | data transformation signal | function |
| --- | --- | --- |
| 0 (low) | X | complement of the number 2 of sinθ, cosθ |
| 1 (high) | 0 | sinθ, cosθ without symbol |
| 1 | 1 | sinθ, cosθ without symbol transforming into complement of the number 2 |

When the mode signal and the data transformation signal both are 1 (high), the symbol of each value of sin θ, cos θ is transformed. The operation of complex multiplier is performed under the condition with symbol or without symbol with respect to the value of the mode signal and the data transformation signal.

According to the present invention as described above, since the time division control signal is generated by use of the first clock and the second clock having twice the speed as that of the first clock, and the multiplying item of two complexes which is time-divided using the time division signal is operated, the complex multiplier is provided with only one multiplier. Therefore, a number of circuit elements and the size of the chip are reduced. Furthermore, the absolute values of sin θ and cos θ are stored in the memory using complement of the number 2 of sin θ and cos θ, thereby reducing the size of the memory by half.

What is claimed:

1. A complex multiplier comprising:
   a control means utilizing a first clock and a second clock having a speed twice as fast as the first clock and generating at least one time division control signal delayed by one-fourth period; and
   a data arithmetic means timely dividing and multiplying components of two complex numbers with respect to the time division control signal applied from the control means and performing complex multiply arithmetic function.

2. The complex multiplier according to claim 1, wherein the control means comprises a first D flip flop which receives the first clock as a data input value and the inverted second clock and outputs a first time division control signal; a second D flip flop which receives the output value of the first D flip flop as the data input value and the second clock and outputs a second time division control signal; a third D flip flop which receives the output value of the second D flip flop as the data input value and the inverted second clock and outputs a third time division control signal; and an inverter for inverting the second clock.

3. The complex multiplier according to claim 2, wherein the data arithmetic means comprises a fourth D flip flop comprising plural D flip flops for latching absolute values of two complex numbers; and each value of sin θ and cos θ corresponding to a real element and an imaginary element; a first multiplexer outputting the selected one value among the absolute values of two complex numbers which are latched in plural D flip flops; a second multiplexer outputting the selected one element among the real and imaginary elements of sin θ and cos θ which are latched in plural D flip flops; a multiplier multiplying the output values of the first multiplexer and the second multiplexer; a fifth D flip flop latching the multiplied value of the absolute value of the first complex and the value of cos θ which are output from the multiplier; a sixth D flip flop latching the multiplied value of the absolute value of the second complex and the value of the sin θ which are output from the multiplier; a seventh D flip flop storing the multiplied value of the absolute value of the first complex and the value of the sin θ which are output from the multiplier; a third multiplexer inputting the output value of the multiplier in the fifth D flip flop to the seventh D flip flop; a subtractor connected to the output terminal of each fifth D flip flop and the sixth D flip flop and subtracting the output value of the sixth D flip flop from the output value of the fifth D flip flop; an adder adding the output value of the seventh D flip flop and the output value of the third multiplexer; and an eighth D flip flop latching the output value for each of the subtractor and the adder.

4. The complex multiplier according to claim 3, wherein the plural D flip flops are latched by the first clock.

5. The complex multiplier according to claim 3, wherein the first multiplexer outputs the absolute value of the first complex when the first clock is high and outputs the absolute value of the second complex when the first clock is low.

6. The complex multiplier according to claim 3, wherein the fifth D flip flop is latched by the first time division signal output from the control means, the sixth D flip flop is latched by the third time division signal, and the seventh D flip flop is latched by the second time division signal.

7. The complex multiplier according to claim 3, wherein the third multiplexer outputs the selected output value of the first multiplexer when the value of cos θ among elements of the two complex numbers is 1.

8. The complex multiplier according to claim 4, wherein the fifth D flip flop through the seventh D flip flop are operated by a fourth time division control signal in which is stored the output value of the multiplier in a predetermined memory during the one data clock period of the complex multiplier.

9. The complex multiplier comprising:
   a control means utilizing a first clock and a second clock having speed twice as fast as the first clock and generating time division control signal which is being delayed by one-fourth period;
   a data arithmetic means timely dividing and multiplying components of two complex numbers with respect to the time division control signal applied from the control means and performing complex multiply arithmetic function; and
   a data transformation means obtaining complements of the numbers of sing and cos θ which correspond to a real element and an imaginary element in accordance with control signal.

10. The complex multiplier according to claim 9, wherein the data transformation means comprises a first complement calculator outputting a calculated complement value of the number 2 of sin θ; a first multiplexer selecting and outputting the one value between the value of sin θ and the complement value of the number 2 output from the first complement calculator; a second complement calculator outputting the calculated complement value of the number 2 of cos θ; a second multiplexer selecting and outputting the one value between the value of cos θ and the complement value of the number 2 output from the second complement calculator; and an ADD gate performing an add operation for a mode signal determining whether each value of the sinθ and cos θ of complex numbers being input with the sign or without the sign, and the data transformation signal indicating whether the mode signal being transformed into value of proper symbol when each value of sinθ and cos θ without symbol being input.

* * * * *

UNITED STATES PATENT AND TRADEMARK OFFICE
CERTIFICATE OF CORRECTION

PATENT NO. : 6,307,907 B1
DATED : October 23, 2001
INVENTOR(S) : Dae-Hyun Kim

It is certified that error appears in the above-identified patent and that said Letters Patent is hereby corrected as shown below:

<u>Column 8, claim 9,</u>
Line 61, please change "sing" to sin θ --.

Signed and Sealed this

Nineteenth Day of March, 2002

Attest:

JAMES E. ROGAN
Attesting Officer  Director of the United States Patent and Trademark Office